(No Model.)
A. NAVAREIN.
CLOISONNÉ WORK FOR WINDOWS, &c.
No. 587,225. Patented July 27, 1897.
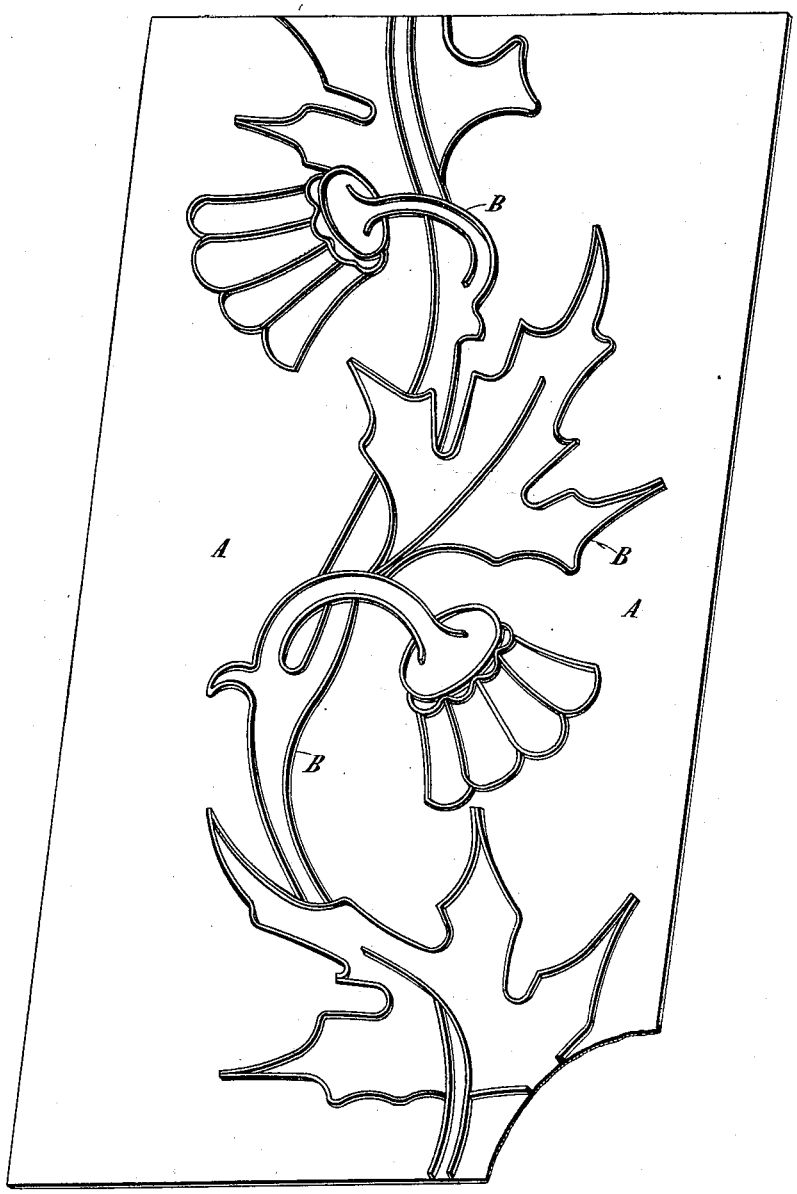

UNITED STATES PATENT OFFICE.

AMEDÉE NAVAREIN, OF PARIS, FRANCE, ASSIGNOR TO THEOPHIL PFISTER AND EMIL BARTHELS, OF LONDON, ENGLAND.

CLOISONNÉ-WORK FOR WINDOWS, &c.

SPECIFICATION forming part of Letters Patent No. 587,225, dated July 27, 1897.

Application filed March 3, 1897. Serial No. 625,877. (No model.)

*To all whom it may concern:*

Be it known that I, AMEDÉE NAVAREIN, artist, a citizen of the Republic of France, residing at 28 Rue du Theatre, Paris, in the Republic of France, have invented certain new and useful Improvements in Cloisonné-Work, of which the following is a specification, reference being had to the accompanying drawing.

This invention relates to cloisonné-work, and has for its object to render cloisonné articles more effective and less expensive than those made by the methods heretofore practiced and to enable the article to be made much more rapidly.

To these ends my invention consists in cloisonné-ware formed and constructed in the manner hereinafter described, and particularly pointed out in the claims following the description, reference being had to the accompanying drawing, which illustrates a perspective view of a piece of cloisonné-ware constructed in accordance with my invention, the cover or backing being removed.

In practicing my invention the design which it is desired to impart to the work is first drawn on a piece of paper and the different parts of the design colored. A clear or transparent plate of glass A is then laid upon the paper, through which may be viewed the colored and outlined design. Narrow strips B, of polished brass or other suitable metal, are then bent to conform to or register with the outlines of the design drawn on the paper, and they are arranged on the glass plate over said outlines. The said strips are cemented to the glass plate by gum-arabic or other suitable adhesive. After the gum has set or become hardened the interstices of the outline are filled in with broken glass of the required degree of fineness and of the proper colors to match the colored drawing. After the interstices have been filled in the particles of broken glass are cemented or bound together by diluted fish-glue or isinglass suitably warmed for the purpose and having mixed therewith a small quantity of bichromate of potash to prevent absorption of moisture from the atmosphere by the glue and to facilitate the subsequent drying. A very small quantity of bichromate is used in order that the glue may not be colored. The glue is spread over the broken glass in any suitable manner, just sufficient glue being used to cover the particles. The whole is then dried at a temperature of about 30° centigrade, and after the drying process is complete the exposed edges of the metallic strips and the surface of the ground glass are covered by a glass plate, and the edges of the two glass plates are sealed and secured together by cement to exclude the air. By this means a highly-decorative and transparent panel is produced at little expense and with expedition.

Opaque cloisonné-ware may be produced in the same manner, powdered glass not suitable for transparent work, powdered china, marble, or other similar substances being used as the filling material, and silicate of potash may be employed to bind the same in a solid mass. The silicate of potash and the broken particles are mixed together and heated to a temperature of about 30° centigrade to form a paste, and the paste is filled in the interstices between the strips, as before described. The back is then covered with an opaque plate or with a layer of cement to enable the panel to be fixed to a wall, for example. Finally the panel is heated to a temperature of about 30° centigrade and the edges sealed with cement, as before described.

The polished brass strips give great brilliancy to the outline of the design, and the transparent colored glass filling combined with the polished brass gives a most elaborate and highly-decorative effect to the product.

Having described my invention, what I claim is—

1. As a new article of manufacture the herein-described decorative article consisting of a transparent base, a plurality of metallic strips bent to form the outlines of a design and attached to said base by adhesive, a granular filling material disposed in the interstices between the bent metallic strips and bound together by fish-glue and bichromate of potash, and a backing cemented air-tight to the edges of the transparent base, substantially as described.

2. A decorative panel consisting of a glass plate, a plurality of polished brass strips bent to form the outlines of a design and attached at their edges to said plate by adhesive, broken glass of contrasting colors disposed in the interstices between said strips and bound together by fish-glue and bichromate of potash, and a glass plate superimposed upon the edges of the metallic strips and cemented air-tight to the edges of the first-named plate, substantially as described.

In testimony whereof I have hereunto set my hand this 3d day of February, 1897.

AMÉDÉE NAVAREIN.

Witnesses:
HONORE CINTRAB,
FANNIE E. JUDGE.